United States Patent

[11] 3,588,422

| [72] | Inventor | Edward William Anderson<br>Cheltenham, England |
| --- | --- | --- |
| [21] | Appl. No. | 761,485 |
| [22] | Filed | Sept. 23, 1968 |
| [45] | Patented | June 28, 1971 |
| [73] | Assignee | Smiths Industries Limited<br>London, England |
| [32] | Priority | Sept. 25, 1967 |
| [33] | | Great Britain |
| [31] | | 43632/67 |

[54] MULTIFUNCTION SELECTOR WITH AUTOMATICALLY CHANGING ANNOTATIONS
13 Claims, 3 Drawing Figs.

[52] U.S. Cl.................................................. 200/167,
40/77
[51] Int. Cl..................................................... H01h 9/18
[50] Field of Search........................................... 200/167;
340/378, 379; 116/124; 220/(Inquired); 73/179;
40/77.4, 77.8

[56] References Cited
UNITED STATES PATENTS

| 2,437,306 | 3/1948 | Ramsay................. | 116/124 |
| --- | --- | --- | --- |
| 3,008,059 | 11/1961 | Gorsuch et al............ | 40/77.8(X) |
| 3,008,247 | 11/1961 | Gaumond.................. | 40/77.8(X) |
| 3,227,847 | 1/1966 | Blodgett................... | 200/167(X) |

Primary Examiner—H. O. Jones
Attorney—Hall, Pollock and Vande Sande

ABSTRACT: Electric switches that are each operable to perform any of a multiplicity of functions in an aircraft navigation system, are spaced along a rotatable member that is inscribed circumferentially with different sets of function-annotations applicable to the switches. Rotation of the member, by motor or hand, brings any one of the annotation-sets into view against the switches and sets circuit-selectors in accordance with the annotated-functions.

PATENTED JUN28 1971

Inventor
Edward William Anderson
By Hall, Pollock & VandeSande
Attorneys

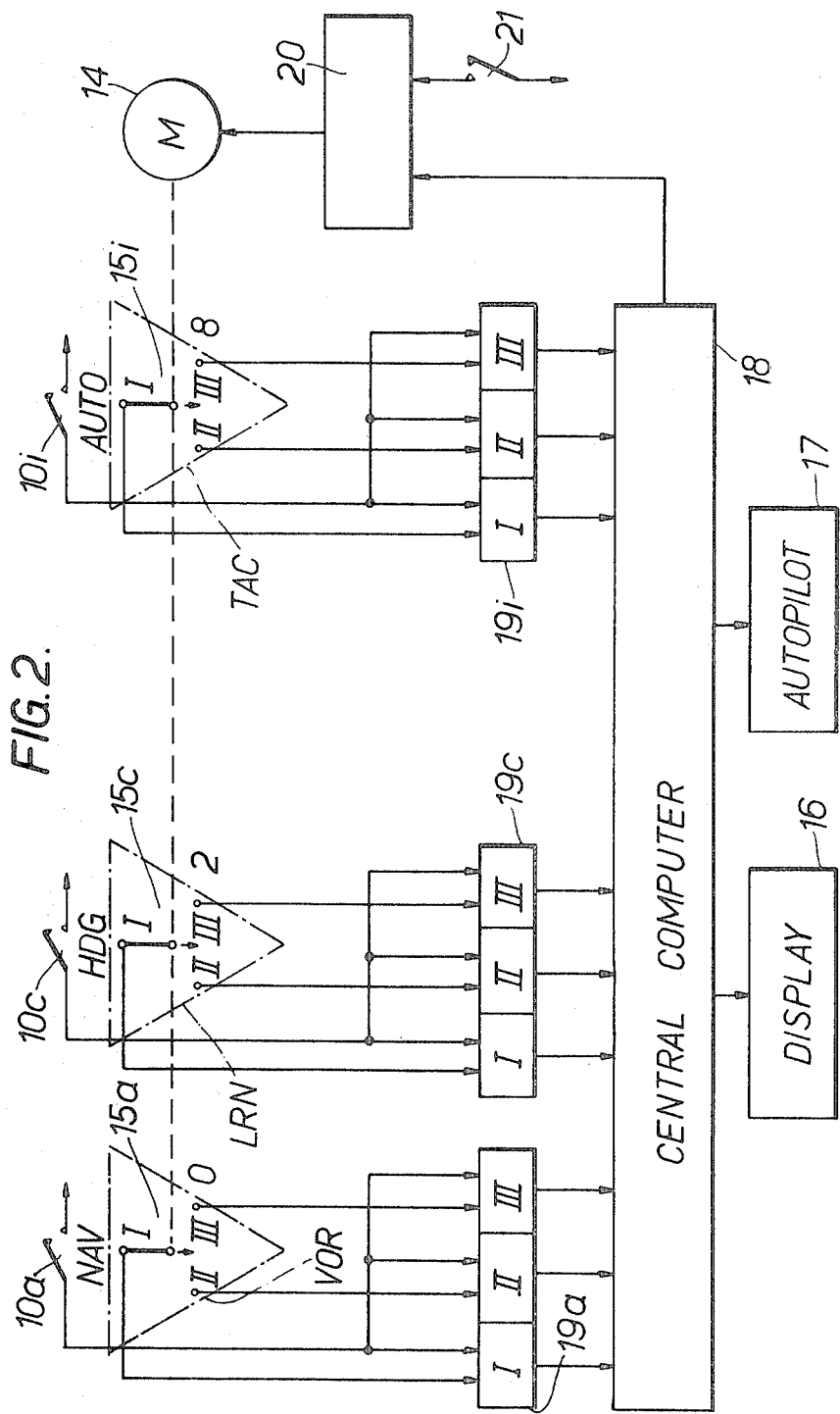

MULTIFUNCTION SELECTOR WITH AUTOMATICALLY CHANGING ANNOTATIONS

This invention relates to selection arrangements.

The invention is especially, though not exclusively, applicable to selection arrangements for use in aircraft.

A major problem in aircraft is the amount of switching required to operate modern flight control, navigation and weapon systems. There are two problems involved. The first is to reduce the number of switches so as to save panel space, and the second is to make it evident to the pilot, navigator or other crew member of the aircraft, the selections made. One way to reduce the number of switches is to allow each switch to accomplish a number of functions and to change its annotation accordingly. It may be arranged that the individual functions of a series of switches are changeable selectively so that, for example, they may be used in one case for the selection of particular navigation aids or modes of flight, and in another case for the selection of particular quantities connected with the selected aid or mode (for example, angles of heading or track). An attempt to achieve a reduction in the number of switches has already been made on these lines, using pushbutton switches each having several annotations, generally four, marked on its button, and arranging that it is only the annotation applicable at the time that is illuminated on each button. An important objection to this, however, is the difficulty of clearly distinguishing the operative annotation from the others under all conditions of ambient lighting experienced in an aircraft. It is one object of the present invention to overcome this difficulty.

According to the present invention a selection arrangement comprises a plurality of selectively operable devices, annotation means which is for annotating the devices individually and which is mounted for movement relative to said devices to adopt any selected one of a plurality of discrete positions relative thereto, said annotation means providing different annotations to the individual devices when occupying different ones of said positions so that the annotation which at any particular time is applicable to any said device is dependent upon which of said positions is then occupied by said annotation means, and means for responding to operation of any one of said devices to perform a function dependent both upon which of said devices is operated and which of said positions is then occupied by said annotation means.

The annotation means may be a rotatably mounted member carrying different annotations applicable to the individual devices around its circumference, and in particular may be of triangular cross section with the annotations inscribed on the three main faces thereof. The said devices may be disposed along the length of an elongated viewing aperture, and said member in these circumstances may be mounted to extend lengthwise of the aperture such that the different ones of said annotations applicable to the individual devices are visible through the aperture for the different positions of said member.

A selection arrangement in accordance with the present invention will now be described, by way of example, with reference to the accompanying drawings, in which:

FIG. 2 shows the selection arrangement in schematic form; and

The selection arrangement to be described is used in the navigation system of an aircraft. The switching device of the arrangement is available for operation by the navigator of the aircraft in selecting particular navigation aids and other facilities, required in the provision of a navigation display and appropriate navigation control of the aircraft.

Figure 1:
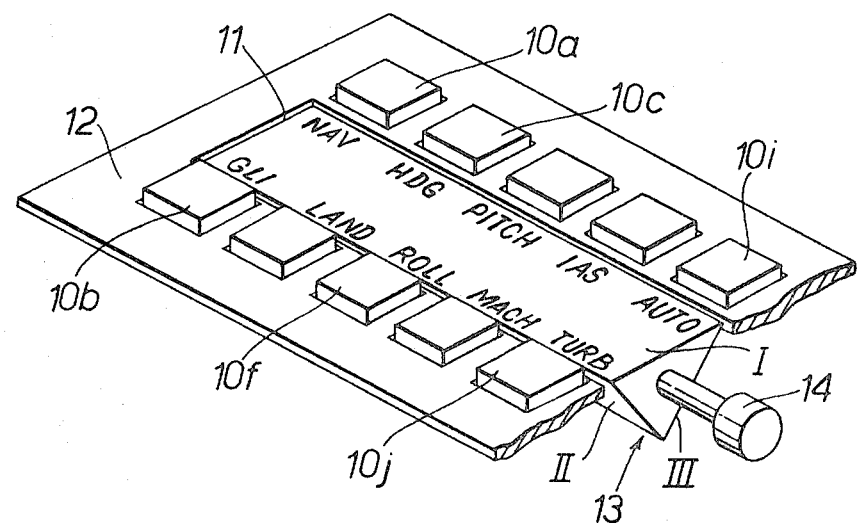
FIG. 1 shows in perspective a switching device that forms part of the selection arrangement.

Referring to FIG. 1, 10 pushbutton electric switches 10a to 10j that are for use in performing three separate selection operations are mounted along and on either side of a viewing slot 11 in a facia-panel 12. The annotations appropriate to the individual switches 10a to 10j for the three selection operations are engraved on the three main faces I, II and III of a hollow member 13 that has the form of an elongated triangular prism. The member 13, which is illuminated from within, extends lengthwise of the slot 11 and is mounted about its longitudinal axis for rotation from one to the other of three discrete rotational positions. In each of these three positions one of the faces I, II and III lies within the slot 11 with the annotations of the respective selection operation visible adjacent the switches 10a to 10j. The member 13 is rotated from one to the other of the three positions by an electric motor 14 according to the selection operation applicable.

Referring to FIG. 2, 10 three-position selectors 15a to 15j (only three of which are shown) are associated respectively with the switches 10a to 10j and are coupled to the motor 14 to be rotated with the member 13. Each of the selectors 15a to 15j is set by the motor 14 to one or other of three positions I, II and III according to which of the respective faces I, II and III of the member 13 occupies the slot 11. Thus the selectors 15a to 15j are set in accordance with the annotations then applicable to the switches 10a to 10j in the relevant selection operation.

In the particular circumstances illustrated in FIGS. 1 and 2, the annotations on face I of the member 13 are concerned with general facilities that are available for selection, the annotations NAV, HDG and AUTO, for example, signifying against the switches 10a, 10c and 10i, navigation aids, heading and autopilot. While the face I is positioned within the slot 11, selection of any one of these general facilities may be effected or enabled, by operation of whichever of the switches 10a to 10j lies adjacent the relevant annotation. Depending upon the selection made so the display provided by a navigation-display unit 16 and or, alternatively, the operation of an autopilot 17 of the aircraft, is modified or is primed for modification. The unit 16 and autopilot 17 operate in accordance with signals supplied thereto from a central navigation computer 18 of the aircraft, the display unit 16 providing a display of information derived from the selected navigation aids, and the autopilot 17 operating according to the navigation aids selected for it. Operation of the switch 10a, annotated NAV on face I of the member 13, enables a change to be made in the navigation aids selected for use in providing the navigation display of the unit 16, whereas operation of the switch 10i, annotated AUTO on face I, enables a corresponding change to be made in the aids coupled to the autopilot 17.

The various navigation aids (not shown) that are available for selection are coupled to the central computer 18 and are annotated on face II of the member 13. The annotations VOR, LRN and TAC which, for example, appear on this face against the switches 10a, 10c and 10i, signify the aids VOR, Loran and Tacan. For selection of any one of the available aids, the member 13 is rotated by the motor 14 to bring face II into the slot 11 in place of face I, with the relevant annotations adjacent the switches 10a to 10j. Such rotation automatically changes the setting of each of the selectors 15a to 15j from position I to position II.

The selectors 15a to 15j are connected to respective gating units 19a to 19j that serve to convey to the central computer 18 signals indicative of operation of the switches 10a to 10j. Each of the gating units 19a to 19j has three stages I, II and III that are energized one at a time according to the settings of the selectors 15a to 15j. The switches 10a to 10j are connected to the gating units 19a to 19j respectively such that operation of any one of these switches causes a signal to be passed to the computer 18 via whichever stage I, II or III of the respective gating unit is then energized. The computer 18 responds to each signal supplied from the units 19a to 19j to carry out the operation desired, in accordance with which of the units 19a to 19j, and also which particular stage I, II or III therein, supplies that signal. In the circumstances for which, as referred to above, NAV or AUTO is selected for effecting change in the navigation aids used, the computer 18 also effects energization of the motor 14 via a motor-control unit 20.

The energization is such as to cause rotation of the member 13 to bring face II in place of face I in the slot 11, the system then being ready for selection of the desired navigation aid simply by operation of whichever of the switches 10a to 10j is appropriate for this according to the annotations then applicable.

The computer 18 is operative to cause rotation of the member 13 to bring face III in place of face II in the slot 11, in the event, for example, of selection of VOR. The annotations on face III are solely numerical, the switches 10a to 10j being annotated on this face with the decimal digits 0 to 9 respectively. When VOR is selected (by operation of switch 10a while face II occupies the slot 11), the computer 18 energizes the motor 14 via the unit 20 such as to bring these numerical annotations into view, and thereby change the setting of each selector 19a to 19j to position III; the computer 18 is at the same time itself primed to receive information regarding the VOR track desired for the aircraft. When the switches 10a to 10j are now operated in turn by the navigator according to the successive decimal digits of the track angle desired, the signals that are as a result supplied from the stages III of the units 19a to 19j convey the required information to the computer 18. According to whether it was NAV or AUTO that was selected in the first instance, so the computer 18 acts in accordance with this information to modify appropriately a display of desired VOR track provided in the navigation display of the unit 16 or, correspondingly, to modify the VOR track to which the autopilot 17 is set to fly the aircraft. Once the selection of the desired track angle has been made the computer 18 is again operative to cause rotation of the member 13, but this time to return the face I to the slot 11.

Selection of HDG by operation of the switch 10c while face I occupies the slot 11, causes the computer 18 to energize the motor 14 via the unit 20 and to be primed ready to receive information regarding the heading desired of the aircraft. The motor 14 is energized in these circumstances to drive the member 13 to the rotational position in which the numerical annotations on face III occupy the slot 11. The navigator operates the switches 10a to 10j in turn according to the heading angle desired, and the resulting signals received by the computer 18 are used thereby to effect the appropriate modification of the heading angle as represented in the navigation display of the unit 16 and to which the autopilot 17 is set to fly the aircraft. Once the selection of heading angle has been made the computer 18 is again operative to cause rotation of the member 13 back to the position in which the face I occupies the slot 11.

A switch 21 is associated with the unit 20 for operation by the navigator to energize the motor 14, in the event that it is desired at any time to bring about rotation of the member 11 from one position to another.

With the arrangement shown by FIGS. 1 and 2, three basic-selection operations can be performed by rotation of the member 13. Where more than three operations are to be performed selectively, the member 13 of triangular cross section may be replaced by a member having a square, pentagonal, or other polygonal cross section, according to the precise number of separate operations involved. The member 13 may, alternatively, be replaced by a cylindrical drum of circular cross section with the different annotations that are applicable to each individual switch for the different selection operations, spaced from one another around the circumference of the drum at one location along its length. An arrangement of this form is shown in FIG. 3.

Figure 3:
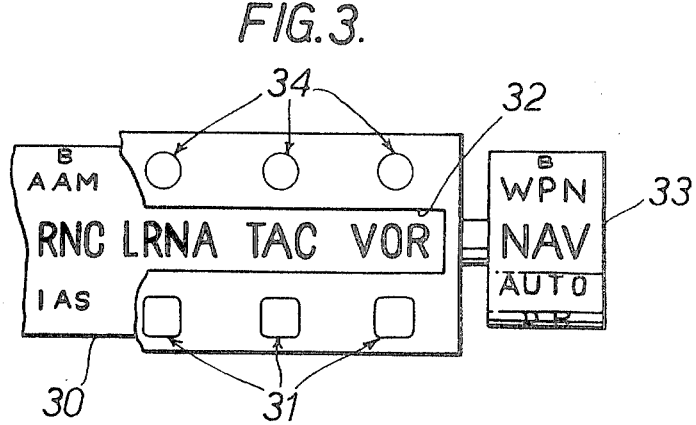
FIG. 3 shows an alternative form of the switching device of FIG. 1.

Referring to FIG. 3, a hollow drum 30 is inscribed with the annotations that are applicable to a series of pushbutton switches 31 for each of 12 different selection operations. The annotations applicable to the different switches 31 for each individual selection operation are spaced from one another along the length of the drum 30 corresponding to the spacing of the switches 31 along a viewing slot 32. The drum 30 is rotatable from one to another of 12 distinct positions so as to bring the appropriate set of annotations into display through the slot 32, according to the selection operation then applicable.

The drum 30 in the present instance is rotatable by hand, and to this end is provided with a control knob 33 inscribed around its circumference with 12 annotations indicative of which of the 12 sets of annotations on the drum 30 is selected for display. A 12-position switch (not shown) coupled to the drum 30 effects the necessary change in the circuitry associated with switches 31, when the drum 30 is rotated.

In FIG. 3, lamps 34 are associated respectively with the switches 31, and each is arranged to light up when its respectively associated switch 31 is operated in order that the navigator may be reminded of the selection made. Rotation of the drum 30 causes the lamp 34 to be extinguished since this indication of the selection made is no longer applicable; however, when the drum 30 is subsequently rotated back to the position in which this indication is applicable, then the lamp 34 again lights up. This operation is achieved using feedback from the source of the action selected, with the aid of the central computer, or by means of an internal memory (provided for example by bistable circuits). The logic is within the normal state of the present art and will not therefore be described. 7 As an alternative to the use of lamps 34, provision may be made for the pushbutton switches 31 to be illuminated internally when a selection has been made. In addition, instead of just one row of switches, two rows of switches may be provided and the annotations on the drum 30 correspondingly doubled. Clearly, also, the drum 30 may be arranged to be rotated by a motor instead of manually.

In both of the above-described arrangements, the pushbutton switches may clearly be replaced by other forms of switch devices, for example, by spring-loaded toggle switches, touch-wire devices, light cells, strain gauges, or other devices able to signal the action of the human finger.

I claim:

1. A selection arrangement comprising a plurality of selectively operable devices, annotation means which is for annotating the devices individually and which is mounted for movement relative to said devices to adopt any selected one of a plurality of discrete positions relative thereto, said annotation means providing different annotations to the individual devices when occupying different ones of said positions so that the annotation which at any particular time is applicable to any said device is dependent upon which of said positions is then occupied by said annotation means, and further means for responding to operation of any one of said devices to perform a function dependent both upon which of said devices is operated and which of said positions is then occupied by said annotation means, said further means including means operable as part of said function to condition said further means to perform a different function in response to subsequent operation of any one of said devices.

2. A selection arrangement according to claim 1 wherein said annotation means is a rotatably mounted member carrying the different annotations applicable to the individual devices spaced from one another around its circumference.

3. A selection arrangement according to claim 2 wherein said member is of triangular cross section with the annotations inscribed on the three main faces thereof.

4. A selection arrangement according to claim 2 wherein said member is of circular cross section.

5. A selection arrangement according to claim 2 including panel means having an elongated viewing aperture therein, and wherein said member is mounted to extend lengthwise of said aperture with the different ones of said annotations applicable to the individual devices visible through said aperture for different ones of said positions of said member, and wherein said devices are mounted on said panel means along the length of said aperture.

6. A selection arrangement according to claim 5 wherein said devices are mounted on said panel means on either side of said aperture.

7. A selection arrangement according to claim 2 wherein a motor is coupled to said member for driving it selectively from one to another of said positions.

8. A selection arrangement according to claim 7 wherein said further means for responding to operation of any one of said devices is operable to energize said motor so as thereby to effect change in position of said member, in dependence upon which of said devices is operated.

9. A selection arrangement according to claim 1 wherein said devices are electric switches.

10. A selection arrangement according to claim 1 wherein said further means for responding to operation of any one of said devices is computing means, and wherein display means is associated with the computing means to provide a display dependent upon the response of the computing means to the operation of any of said devices.

11. A selection arrangement comprising a rotatably mounted member that is rotatable from one to another of a plurality of discrete positions, a plurality of selectively operable devices disposed along the length of said member, said member being inscribed around its circumference with different annotations applicable to said individual devices so that at any time the particular annotation applied to each individual device is dependent upon which of said positions is then occupied by said member, selector means coupled to said member to be set in accordance with which of said positions is occupied by said member, and means for responding to operation of any one of said devices to perform a function that is dependent both upon which of said devices is operated and the setting of said selector means.

12. In an aircraft flight system having a plurality of flight facilities that are each operable in any selected one of a plurality of conditions, a plurality of selectively operable devices, annotation means which is for annotating the devices individually and which is mounted for movement relative to said devices to adopt any selected one of a plurality of discrete positions relative thereto, said annotation means providing different facility-annotations to the different devices when occupying a first of said positions and providing different condition-annotations to these different devices when occupying a second of said positions so that the annotation which at any particular time is applicable to any said device is dependent upon which of said first and second positions is then occupied by said annotation means, and further means for responding to operation of any one of said devices to perform a function dependent both upon which of said devices is operated and which of said first and second positions is then occupied by said annotation means, said further means including priming means responsive to operation of any one of said devices when annotated with a facility-annotation to prime the corresponding facility for change in its operative condition, and operating means responsive to the priming of a facility as aforesaid to respond to the next operation of a said device when annotated with a condition-annotation to bring that facility into the corresponding condition.

13. A selection arrangement comprising a plurality of selectively operable devices, a member which carries annotations for annotating the devices individually, drive means operable to move said member into any one of a plurality of discrete positions relative to said devices, said member providing different annotations to the individual devices when occupying different ones of said positions so that the annotation which at any particular time is applicable to any said device is dependent upon which of said positions is then occupied by said member, and further means for responding to operation of any one of said devices to operate said drive means to move said member into a selected one of said positions, said selected position being dependent both upon which of said devices is operated and which of said positions is then occupied by said member.